Figure 1:
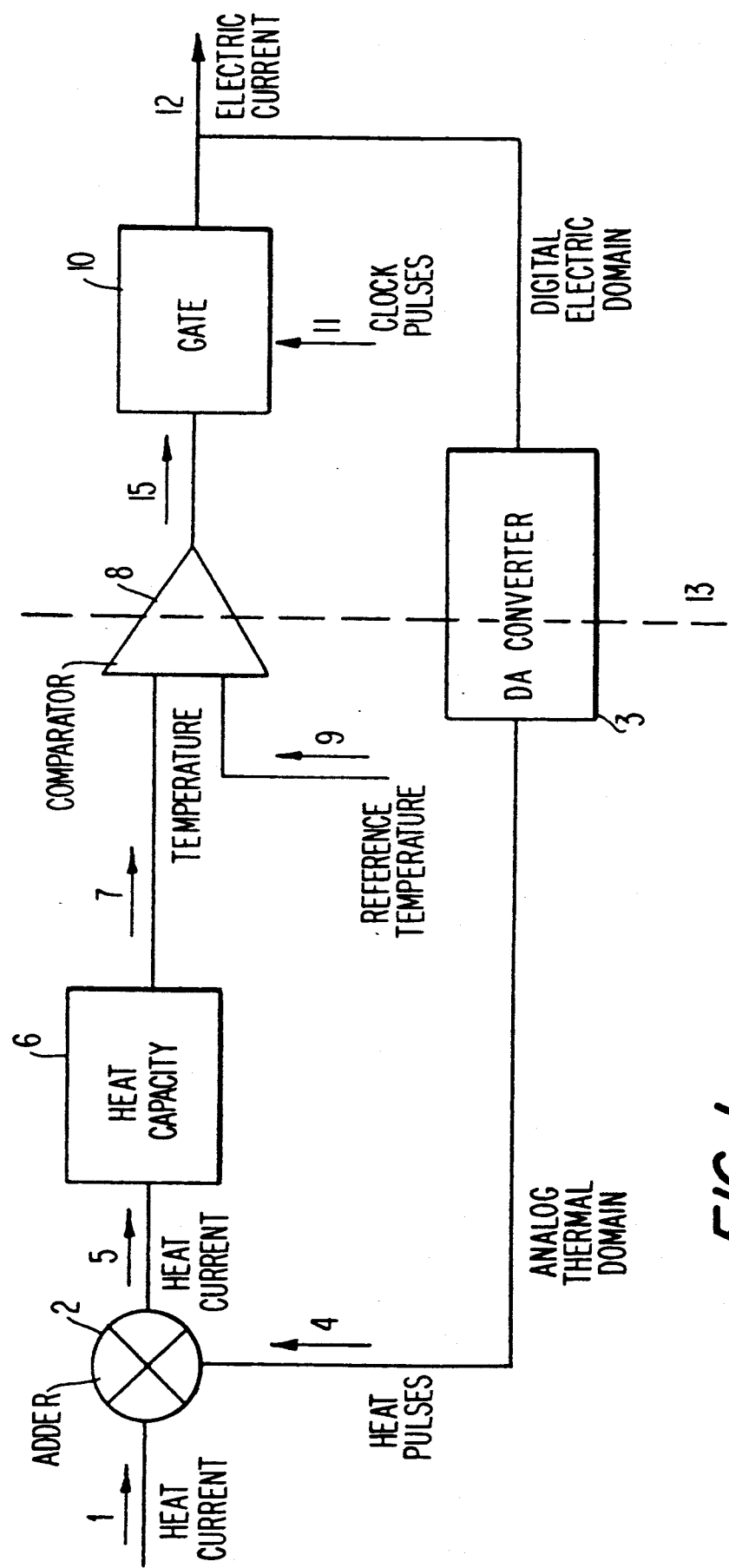

United States Patent [19]

Huijsing et al.

[11] Patent Number: 5,064,296
[45] Date of Patent: Nov. 12, 1991

[54] INTEGRATED SEMICONDUCTOR CIRCUIT FOR THERMAL MEASUREMENTS

[75] Inventors: Johan H. Huijsing, Schipluiden; Frank R. Riedijk, Pijnacker, both of Netherlands

[73] Assignee: Bronkhorst High-Tech B.V., Ruurlo, Netherlands

[21] Appl. No.: 542,177

[22] Filed: Jun. 22, 1990

[30] Foreign Application Priority Data

Jun. 23, 1989 [NL] Netherlands .......... 8901602

[51] Int. Cl.$^5$ .......... G01K 7/00; G01K 17/04; G01F 1/68
[52] U.S. Cl. .......... 374/163; 374/170; 374/173; 73/204.11; 73/204.15
[58] Field of Search .......... 374/163, 128, 170, 171, 374/172, 173, 183; 364/557; 73/204.11–204.24; 250/370.15; 375/28; 341/43

[56] References Cited

U.S. PATENT DOCUMENTS

| | | | |
|---|---|---|---|
| 4,008,617 | 2/1977 | Yen et al. | 374/170 X |
| 4,045,658 | 8/1977 | Peltola | 374/171 X |
| 4,186,384 | 1/1980 | Acker | 375/28 X |
| 4,373,386 | 2/1983 | Huijsing | 73/204.22 |
| 4,439,756 | 3/1984 | Shenoi et al. | 341/143 |
| 4,651,564 | 3/1987 | Honeywell | 73/204.26 |
| 4,672,361 | 6/1987 | Kokubo | 375/28 |
| 4,693,116 | 9/1987 | Soken | 73/204.16 |
| 4,782,708 | 11/1988 | Harrington | 73/204.24 |
| 4,866,442 | 9/1989 | Steim et al. | 375/28 X |
| 4,890,489 | 1/1990 | Bronkhorst | 73/189 |

FOREIGN PATENT DOCUMENTS

| | | | |
|---|---|---|---|
| 851117 | 7/1981 | U.S.S.R. | 374/163 |
| 898266 | 1/1982 | U.S.S.R. | 374/163 |
| 1364911 | 1/1988 | U.S.S.R. | 374/163 |

OTHER PUBLICATIONS

Electronics Letters, vol. 24, No. 9, 28th Apr. 1988; pp. 542–543.

Primary Examiner—Stuart S. Levy
Assistant Examiner—Joseph A. Rhoa
Attorney, Agent, or Firm—Rosen, Dainow & Jacobs

[57] ABSTRACT

Integrated semiconductor circuit for thermal measurements, comprising at least a thermal signal comparator (8), the comparator (8) being provided with a signal feedback loop containing a DA signal converter (3), more specifically, the comparator (8) being a temperature or a heat current comparator, the DA signal-converter (3) comprising a thermal output and the signal feedback loop comprising components for the transfer of thermal signals.

2 Claims, 1 Drawing Sheet

INTEGRATED SEMICONDUCTOR CIRCUIT FOR THERMAL MEASUREMENTS

The invention relates to an integrated semiconductor circuit for measurements of thermal signals comprising a thermal feedback loop.

Such a semiconductor circuit is known from an article by Y. Pan and J. H. Huijsing in Electronic Letters 24 (1988), 542-543. This circuit is theoretically appropriate for measuring physical quantities such as speed of flow, pressure, IR-radiation, or effective value of electrical voltage or current (RMS), the influence of the quantity to be measured on the heat transfer of a heated integrated semiconductor circuit (chip) to its environment being determined in these cases. In these measurements, a signal conversion takes place twice: from the physical (speed of flow, pressure, IR-radiation or RMS value) to the thermal domain, and from the thermal to the electrical domain.

This known semiconductor circuit theoretically consists of a heating element, integrated in the circuit, and a temperature sensor. The power dissipated in the heating element is measured with the help of an integrated amplifier unit, an amplifier with a positive feedback loop being used, because of which the temperature oscillates around a constant value with a small amplitude.

Although in the known circuit the temperature will oscillate in a natural way, because of the existence of a finite transfer time of the heating element and the temperature sensor with a high amplifier-factor, a circuit with a well-defined clock-sampled signal is to be preferred, because the output signal of such a circuit is more appropriate for direct processing in a microprocessor, and thus one has obtained free disposition of a so-called "smart sensor".

Purpose of the invention is to provide an integrated semiconductor circuit for thermal measurements, supplying one or more output signals, appropriate for processing in a microprocessor.

This purpose is realized, according to the invention made by J. H. Huijsing and F. R. Riedijk, with a circuit of which the comparator is provided with a signal feedback loop comprising a digital-analog (DA) converter.

In a circuit according to the invention, the DA signal converter in the feedback loop and the comparator, in combination with other components, not necessarily integrated in the chip, form an analog-digital (AD) signal converter. The AD converter is arranged, dependent upon the purpose for which the circuit is applied, in such a way that it can supply the desired output signals in digital form.

In a practical example of the circuit according to the invention, the comparator is a temperature or a heat current comparator having two thermal inputs and an electrical digital output, the DA signal converter comprises an analog thermal output and the signal feedback loop comprises components for the transfer of thermal (temperature- and heat-current) signals.

In this practical example, the measuring accuracy of the circuit is systematically increased, because certain signal processings can take place in the thermal domain, even before signal conversion to the (analog or digital) electric domain (the occurrence of conversion errors connected with that) takes place.

In an example, not excluding other embodiments, the circuit contains components which comprise at least an adder unit for heat currents and a heat capacity, the circuit is provided with a temperature or heat current comparator with an electrical output, the circuit is provided with a 1-bit DA signal converter for converting electrical signals into heat pulses and the signal feedback loop comprises a gating unit for a clock signal. In a variant of the last example, the adder unit comprises means with which negative heat currents are also added, and consequently operates as a subtractor unit, and the 1-bit DA converter comprises a cooling element, e.g. a Peltier element.

The advantages of the invention are especially apparent in a circuit in which the signal feedback loop comprises components which, in cooperation with the comparator, form a sigma-delta modulator.

A sigma-delta modulator is a circuit that generally consists of at least an adder or a subtractor unit, an integrator (a capacity), a signal-comparator, a clock-controlled flip-flop circuit and a 1-bit DA signal converter. (The modulator derives its name from the combination of an integrator, often designated by sigma, and a pulse supplying DA converter, designated by delta).

A sigma-delta modulator takes up relatively little of the surface of a semiconductor circuit, the method of preparing a sigma-delta modulator, appropriate for the thermal domain, not differing from a variant appropriate for the electric domain.

The accuracy of a circuit according to the invention, provided with a sigma-delta modulator active in the thermal domain, is mainly determined by the accuracy of the DA converter integrated in the circuit and the accuracy of the operation of subtracting. In such a circuit the inaccuracy which is caused by the conversion of a thermal sensor-signal to an electrical signal is eliminated, at least reduced to the inaccuracy of the comparator, which is a 1-bit AD signal converter.

A next practical example of the circuit according to the invention is characterized in that the number of different thermal signals to be measured and the number of AD signal converters are both four.

Such a circuit is appropriate, for instance for application in a thermal flow meter, with which it is possible to determine, in an otherwise well-known way, the direction and speed of the flow from the cooling that causes a flow at the place of the sensors.

In yet another practical example of a circuit according to the invention, with four thermal signals to be measured, this circuit is arranged in such a way that two temperature or heat sensors are placed on the line that perpendicularly cuts the line connecting the two other sensors, and the circuit also comprises means with which the temperature can be raised in certain places.

The invention will now be explained further at the hand of the drawing.

FIG. 1 shows, as a practical example of the part of a circuit, according to the invention, a sigma-delta modulator, appropriate for signal processing in the thermal area.

FIG. 1 shows a comparator (8) and a signal feedback loop connected between an output and a first input of the comparator (8).

In FIG. 1 the arrow (1) denotes a heat current to be measured, which is added in the adder unit (2) with the heat pulse (4) coming from the 1-bit (thermal) DA-converter (3). The summed signal (a heat current) (5) is supplied to an integrator (6) (a heat capacity). The signal (7) coming from the integrator (a temperature) is a first thermal input to comparator (8). The first input (7)

is compared, in signal comparator (8), to a reference signal (9) (also a temperature). The comparator (8) has an electrical digital output (15) which is connected as a first input to gate (10). The gate (10) has a second input (11) connected to a clock pulse (or signal). The gating unit (10) lets a clock signal (11) pass to the output (an electrical digital output) 12 as soon as the signal (7) is larger than the reference signal (9). The output signal (12) is fed back via the DA converter (3); as soon as the input signal (1), integrated in integrator (6), exceeds a value (determined by reference signal (9), the DA converter (3) supplies an energy pulse (4). The number of clock pulses (11) that the gate (10) lets pass is a measure of the signal strength, that is the measured heat current (1). The dotted line (13) schematically denotes the division between the (analog) thermal domain on the left and the (digital) electric domain on the right of the dotted line (13).

We claim:

1. Integrated semiconductor circuit for measurements of thermal signals, comprising a thermal signal comparator (8) having a first thermal input, a second thermal input and an electrical digital output;

a feedback loop connected between the output and the first input of the comparator, said feedback loop comprising a digital-analog (DA) signal converter (3) which provides an analog thermal output;

an adder unit for heat currents having an output connected to a heat capacity having a temperature output connected to the first thermal input of said comparator;

said feedback loop comprising a gating unit having a first input connected to the output of the comparator, a second input connected to a clock pulse and a digital electric output connected to the input of the digital-analog (DA) converter.

2. Integrated semiconductor circuit according to claim 1, wherein the adder unit comprises means for adding negative heat currents, and wherein the DA converter comprises a cooling element.

* * * * *